United States Patent [19]

Matsuo et al.

[11] Patent Number: 5,497,143

[45] Date of Patent: Mar. 5, 1996

[54] ELECTRONIC DEVICE FOR A VEHICLE

[75] Inventors: Mitsuaki Matsuo, Hachioji; Yasuo Kuroki; Takashi Kanzaki, both of Akishima, all of Japan

[73] Assignee: Casio Computer Co., Ltd., Tokyo, Japan

[21] Appl. No.: 258,091

[22] Filed: Jun. 10, 1994

[30] Foreign Application Priority Data

Jun. 24, 1993 [JP] Japan .................................. 5-177337
Jun. 30, 1993 [JP] Japan .................................. 5-189321

[51] Int. Cl.$^6$ .................................. B62J 3/00; B60Q 1/00
[52] U.S. Cl. .................................. 340/432; 340/459; 340/461; 340/438; 340/456; 340/601; 340/870.01; 364/420
[58] Field of Search .................................. 340/432, 459, 340/438, 461, 462, 525, 456, 601, 602, 973, 870.1; 364/424.01–424.05, 431.05, 431.12, 420; 342/26

[56] References Cited

U.S. PATENT DOCUMENTS

| | | | |
|---|---|---|---|
| 4,633,216 | 12/1986 | Tsuyama | 340/462 |
| 4,859,984 | 8/1989 | Romano | 340/462 |
| 5,008,647 | 4/1991 | Brunt et al. | 340/462 |
| 5,017,916 | 5/1991 | Londt et al. | 340/461 |
| 5,309,139 | 5/1994 | Austin | 340/461 |

*Primary Examiner*—Donnie L. Grosland
*Attorney, Agent, or Firm*—Frishauf, Holtz, Goodman, Langer & Chick

[57] ABSTRACT

An electronic device for a vehicle detects the number of rotations of a wheel of a vehicle, calculates the distance covered by the vehicle, measures the atmospheric pressure to provide data on the atmospheric pressure, obtains a height corresponding to the measured atmospheric pressure from a height-atmospheric pressure conversion table stored in a RAM on the basis of the measured atmospheric pressure data, calculates an tilt of a road where the vehicle travels on the basis of the height and the measured covered distance, detects a gear corresponding to the calculated tilt from a gear change conversion table, drives a transmission to put the gear in the meshed state. In order to apply a barometer to a weather forecast, an actual height where the vehicle travels is calculated on the basis of data on a tilt of the road measured by an inclinometer attached to the vehicle and the calculated covered distance. A change in the atmospheric pressure due to weather is distinguished from that due to the height to predict weather. The inventive device sets a gear suitable for the road and provides weather prediction, thereby bringing about efficient safe cycling.

9 Claims, 12 Drawing Sheets

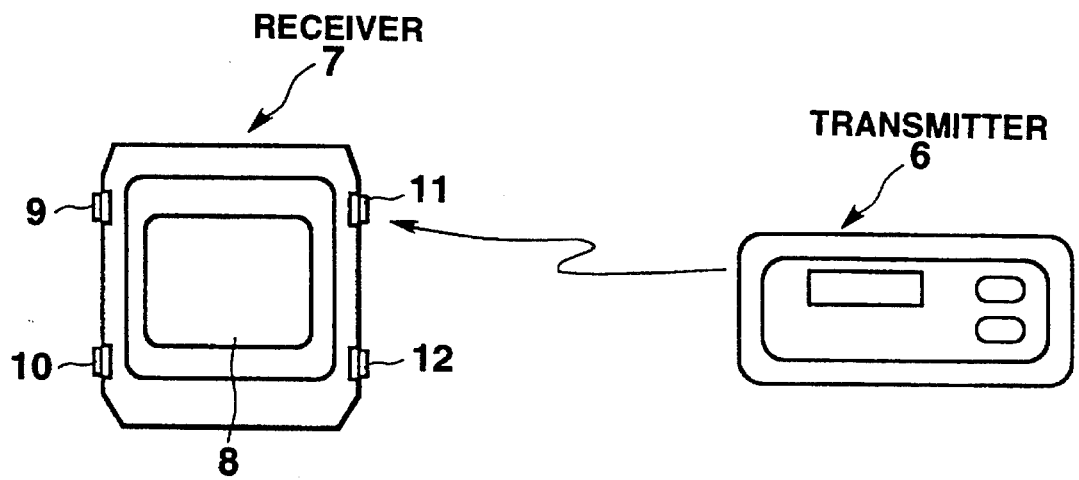
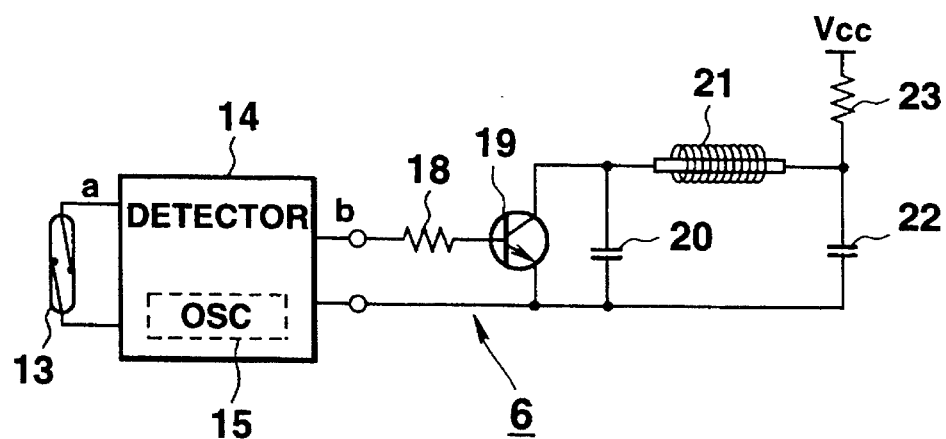

FIG.5

RAM 26

| | |
|---|---|
| 26a | TIRE SIZE |
| 26b | TRAVELING SPEED |
| 26c | COVERED DISTANCE |
| 26d | TILT ANGLE |
| 26e | ATMOSPHERIC PRESSURE |
| 26f | HEIGHT |

FIG.6

ROM 27

| TILT ANGLE θ | GEAR |
|---|---|
| 5°~10° | NO.6 |
| 11°~15° | NO.5 |
| 16°~20° | NO.4 |
| 21°~25° | NO.3 |
| 26°~30° | NO.2 |
| ≧ 31° | NO.1 |

FIG.7

ROM 27

| HEIGHT (m) | ATMOSPHERIC PRESSURE (hp) | HEIGHT (m) | ATMOSPHERIC PRESSURE (hp) |
|---|---|---|---|
| 0 | 1013.3 | ⋮ | ⋮ |
| 200 | 989.5 | 4800 | 554.8 |
| 400 | 966.1 | 5000 | 540.2 |
| 600 | 943.2 | | |
| 800 | 920.8 | | |
| 1000 | 898.7 | | |
| 1200 | 877.2 | | |
| ⋮ | ⋮ | 6000 | 471.8 |
| 2000 | 795.0 | | |
| 2200 | 775.4 | | |
| 2400 | 756.3 | 7000 | 410.6 |
| ⋮ | ⋮ | | |
| 3000 | 701.1 | | |
| ⋮ | ⋮ | 7800 | 366.4 |
| | | 8000 | 356.0 |

FIG.12

ROM 27

| TILT ANGLE θ \ TRAVELING SPEED | 1~10km/h | 11~20km/h | ≧ 21km/h |
|---|---|---|---|
| 0°~10° | NO.6 | NO.6 | NO.6 |
| 11°~15° | NO.5 | NO.6 | NO.6 |
| 16°~20° | NO.4 | NO.5 | NO.6 |
| 21°~25° | NO.3 | NO.4 | NO.5 |
| 26°~30° | NO.2 | NO.3 | NO.4 |
| ≧ 31° | NO.1 | NO.2 | NO.3 |

FIG.15

ROM 27 — 33

| HEIGHT (m) | ATMOSPHERIC PRESSURE (hp) | HEIGHT (m) | ATMOSPHERIC PRESSURE (hp) |
|---|---|---|---|
| 0 | 1013.3 | | |
| 200 | 989.5 | 4800 | 554.8 |
| 400 | 966.1 | 5000 | 540.2 |
| 600 | 943.2 | | |
| 800 | 920.8 | | |
| 1000 | 898.7 | | |
| 1200 | 877.2 | | |
| | | 6000 | 471.8 |
| 2000 | 795.0 | | |
| 2200 | 775.4 | | |
| 2400 | 756.3 | 7000 | 410.6 |
| 3000 | 701.1 | | |
| | | 7800 | 366.4 |
| | | 8000 | 356.0 |

5,497,143

1

ELECTRONIC DEVICE FOR A VEHICLE

BACKGROUND OF THE INVENTION

The present invention relates to electronic devices for a vehicle which detect the state of the environment of a vehicle and more particularly to an electronic device for a vehicle which detects a gradient and height of a road where a vehicle travels, detects the atmospheric pressure and processes data on those parameters.

Conventionally, for example, a cycle computer is known which is attached to a bicycle. The cycle computer includes a magnet attached to a spoke of a wheel of a bicycle, a magnetic sensor fixed to the non-rotating bicycle body so as to be positioned outside the rotational orbit of the magnet for sensing magnetic flux from the magnet, and a unit which receives a signal indicative of magnetic detection from the magnetic sensor to calculate and display the traveling speed and covered distance of the bicycle.

The traveling speed and covered distance displayed in the cycle computer are, however, only data on the results of the traveling. Thus, even if such data is displayed, it is not useful for the manipulation of the bicycle for traveling purposes and for efficient travelling of the bicycle depending on the situation of a road on which the bicycle travels.

SUMMARY OF THE INVENTION

It is therefore an object of the present invention to provide an electronic device for a vehicle which provides information useful for the traveling of a vehicle.

In order to achieve the above object, according to the present invention, there is provided an electronic device for a wheeled vehicle, comprising:

calculating means for detecting the number of rotations of the wheel to calculate moving state data including at least one of the travelling speed and covered distance of the vehicle;

first display means for displaying the moving state data calculated by the calculating means; atmospheric pressure measuring means for measuring the atmospheric pressure to provide data on the atmospheric pressure; and second display means for displaying data on the atmospheric pressure measured by the atmospheric pressure measuring means.

This arrangement serves to provide efficient safe cycling.

BRIEF DESCRIPTION OF THE DRAWINGS

FIG. 2 is a front view of a transmitter and a receiver of the embodiment.

FIG. 3 is a circuit diagram of the transmitter.

FIG. 5 shows the structure of a RAM.

FIG. 6 shows the contents of a gear change conversion table stored in a ROM.

FIG. 7 shows the contents of a height-atmospheric pressure conversion table stored in a ROM.

2

Figure 10:
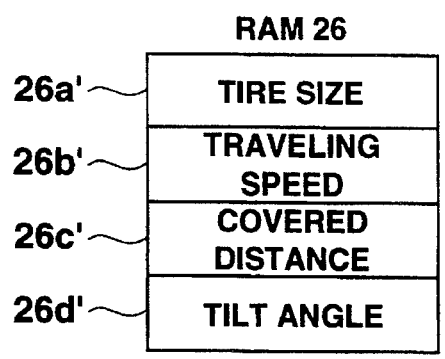

FIG. 10 shows the structure of a RAM of the further embodiment.

Figure 11:
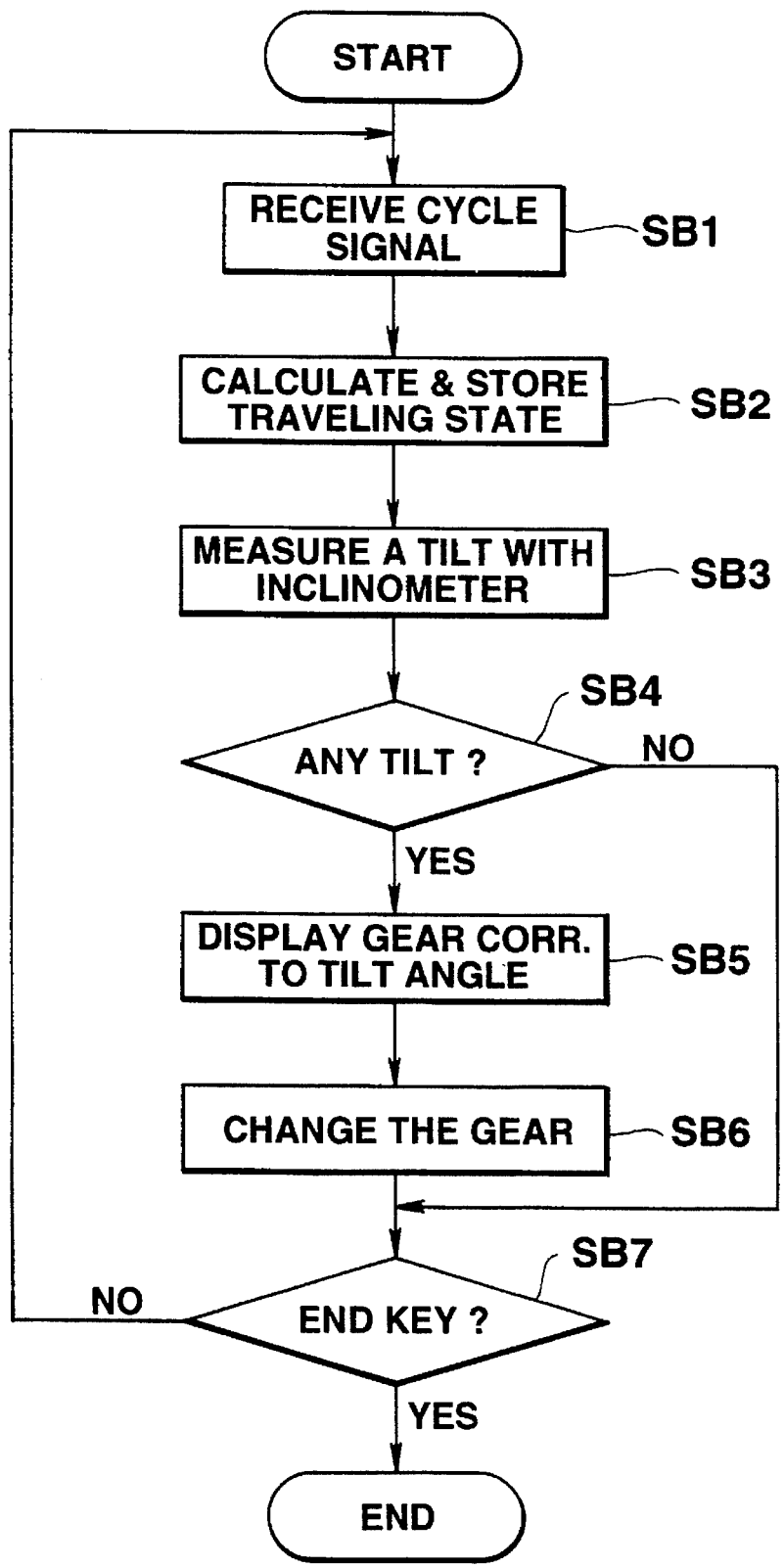

FIG. 11 is a flowchart indicative of the operation of the further embodiment.

FIG. 12 shows the contents of a gear change conversion table stored in a ROM of the further embodiment.

Figure 13:
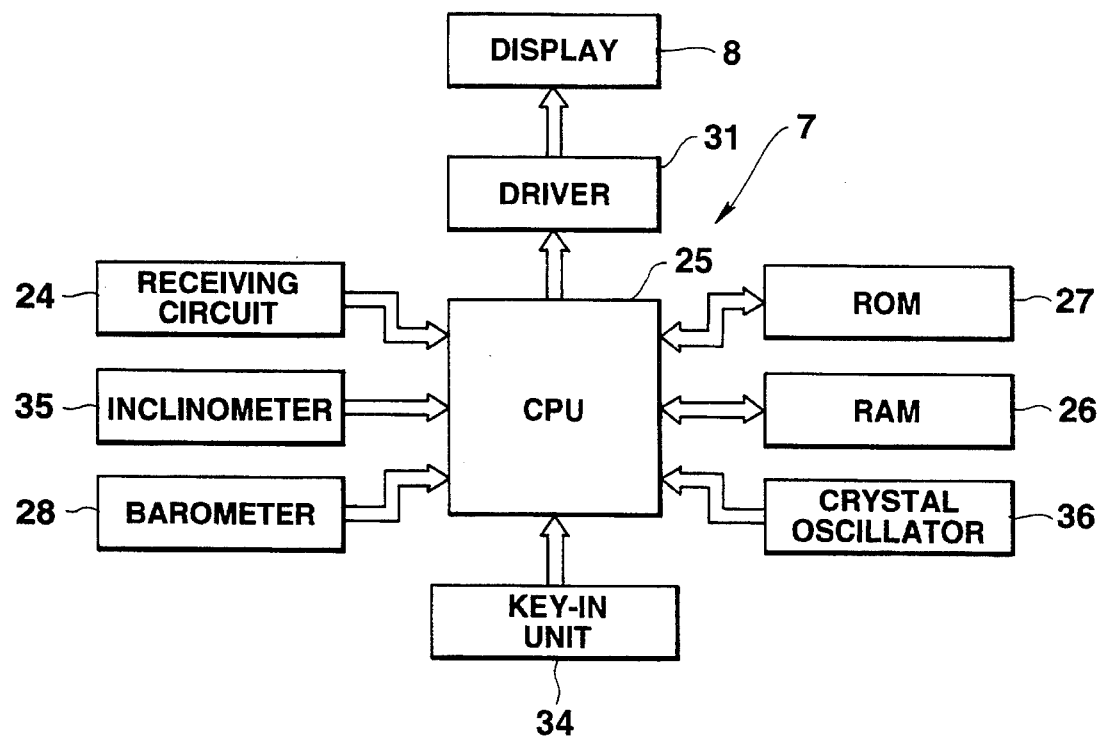

FIG. 13 is a block diagram of a receiver of a still further embodiment of the present invention.

Figure 14:
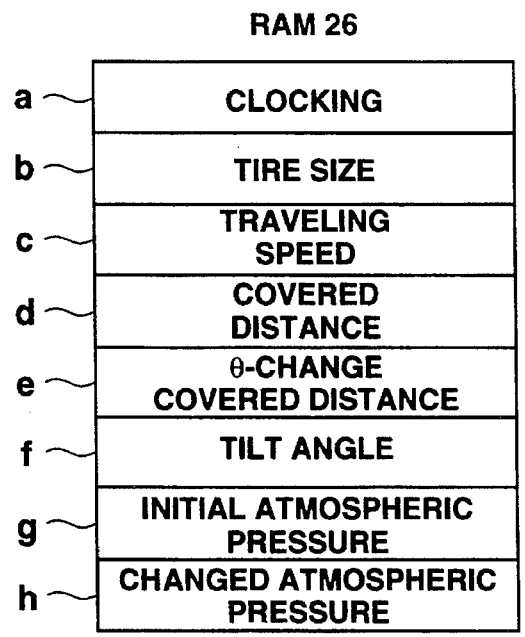

FIG. 14 shows the structure of a RAM of the still further embodiment.

FIG. 15 shows the contents of a height-atmospheric pressure conversion table stored in a ROM of the still further embodiment.

Figure 16:
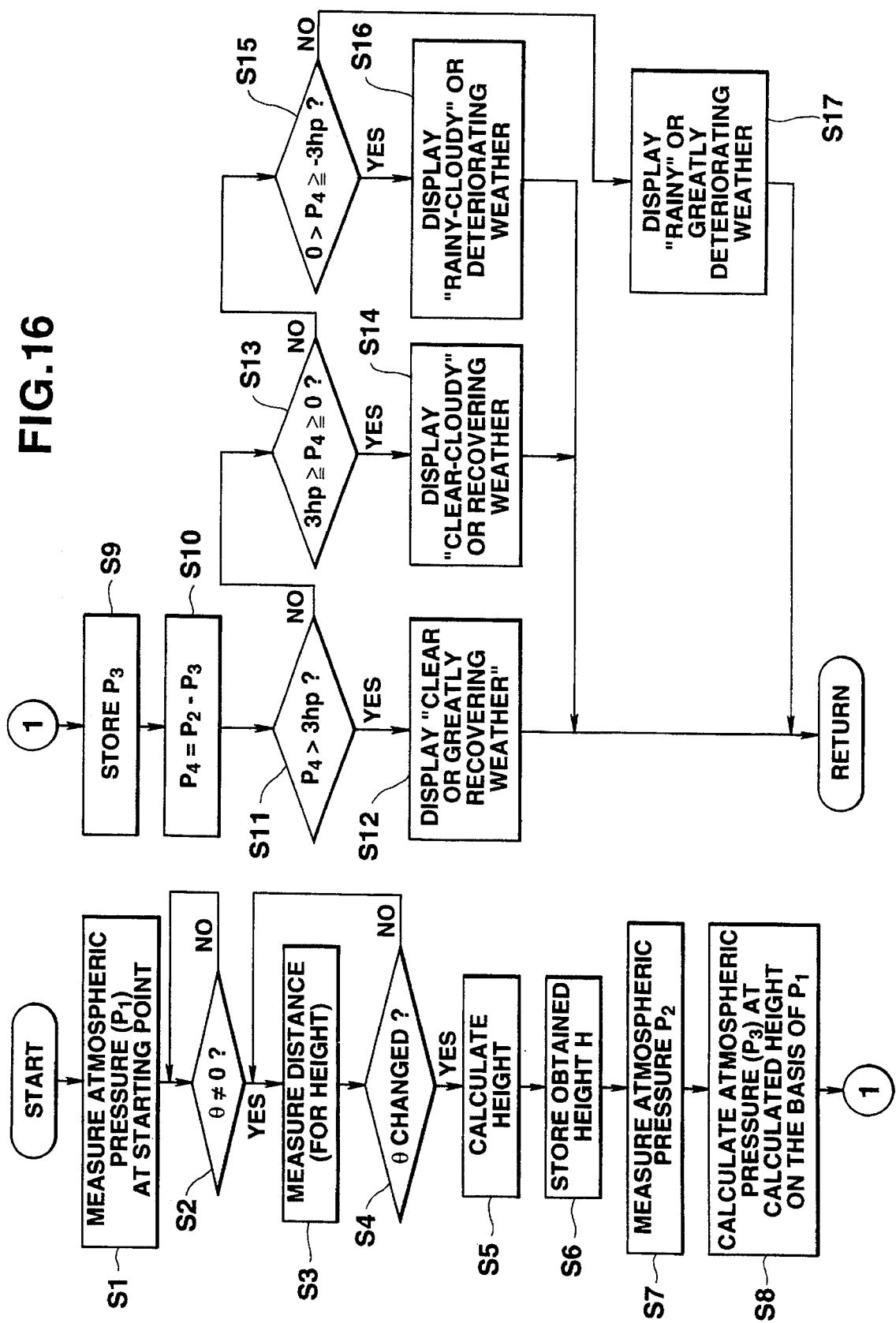

FIG. 16 is a flowchart indicative of the operation of the still further embodiment.

DETAILED DESCRIPTION OF THE PREFERRED EMBODIMENTS

Figure 1:
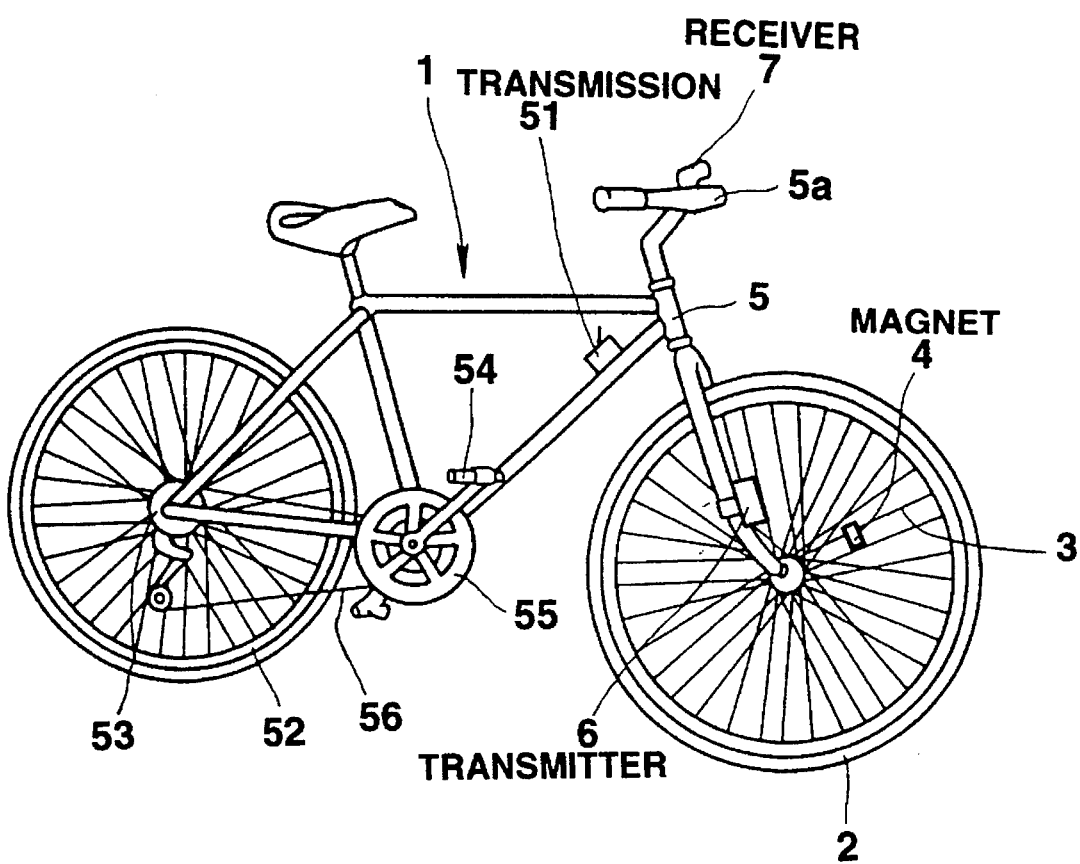
FIG. 1 is a side view of a bicycle to which one embodiment of the present invention is applied.

Embodiments of the present invention will be described with respect to the accompanying drawings. FIG. 1 is a side view of a bicycle 1 to which an electronic device for a vehicle as one embodiment of the present invention is applied. A magnet 4 is attached to one of spokes 3 of a front wheel 2 of the bicycle 1. A transmitter 6 is attached to a body 5 of the bicycle 1 outside the rotational orbit of the magnet 4 with a receiver 7 being attached to a handle 5a above the transmitter 6. A transmission 51 is attached to the bicycle body 5, and is composed of an electromagnetic actuator which is actuated in accordance with a signal from a gear changer to be described in more detail later. An endless chain 56 is selectively engaged between a plurality of rear gears 53 provided on the side of a rear wheel 52 and a plurality of front gears 55 provided on the side of a pedal 54 to provide six transmission gear states. In the present embodiment, a gear No. 1 sets the distance covered by one rotation of the pedal 54 at a small value so as to go easily up a sloping road to thereby require only a small force required for pedaling the bicycle. As the gear No. increases, the force required for pedaling the bicycle increases while the distance covered by one rotation of the pedal increases to thereby travel smoothly on a flat ground. As shown in FIG. 2, a display 8 including an LCD (Liquid Crystal Device) is provided on an upper surface of the receiver 7. A key-in unit 9, a start key 10, and an end key 11 which are used for the user to input data on a set distance, a set speed, and a set time, and a further key 12 which is used to input data on the size of the bicycle tires are provided on the periphery of the display 8.

FIG. 3 is a circuit diagram of the transmitter 6. A normally open reed switch 13 is closed when the magnet 4 passes by the transmitter 6 to output a reed switch signal a to a detector 14, which includes an oscillator 15. The oscillator 15 receives the reed switch signal a to convert it to a series of clock signals b, which is sent through a resistor 18 to the base of an npn-transistor 19. A capacitor 20 is connected across the collector and emitter of the transistor 19 with its collector being connected to one end of an electromagnetic induction coil 21 and the emitter of the transistor being connected to the detector 14. A voltage Vcc is applied through a resistor 23 to the end of the coil 21 and one end of a capacitor 22, the other end of which is connected to the emitter of the transistor 19. Thus, when a clock signal b is fed to the transistor 19, the electromagnetic induction coil 21 generates an electromagnetic induction signal.

Figure 4:
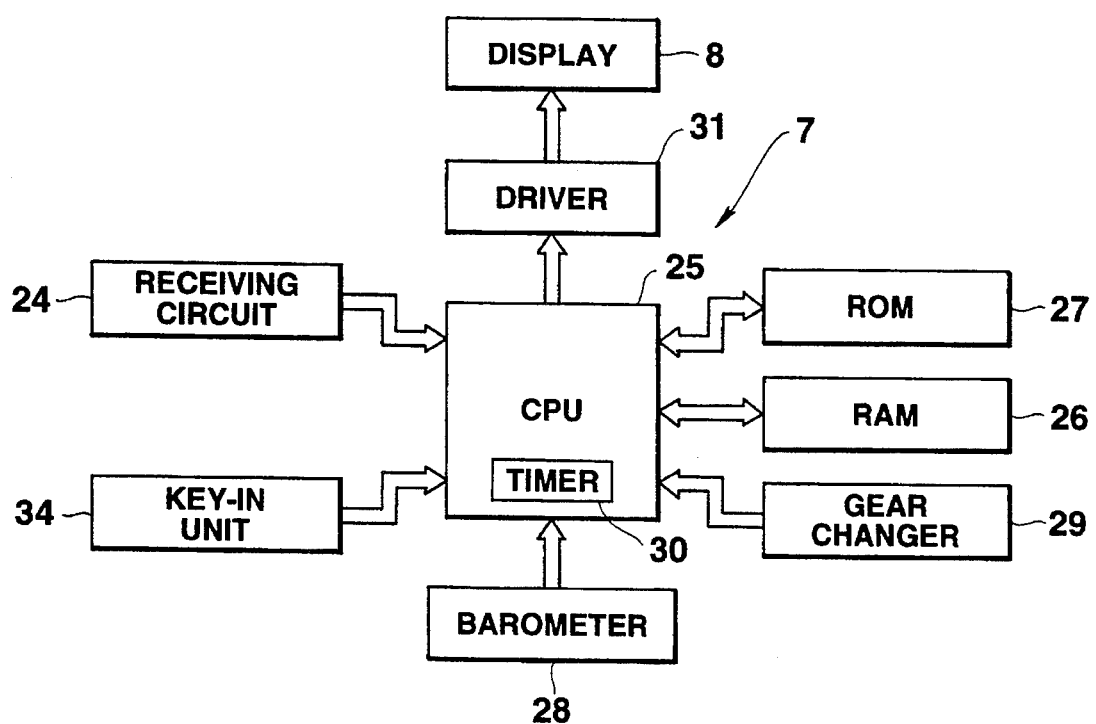
FIG. 4 is a circuit diagram of the receiver.

FIG. 4 is a block diagram of the receiver 7. In FIG. 4, the electromagnetic induction signal from the electromagnetic coil 21 of the transmitter 6 is received by an electromagnetic induction coil (not shown) of a receiving circuit 24 and sent to a CPU 25. The CPU 25 includes a timer 30 and operates in accordance with a program stored in the ROM 27 and data stored in the RAM 26 to thereby control the whole receiver 7. The CPU 25 controls a display 8 through a display driver 31 and also controls the gear changer 29 which drives the transmission 51. The key-in unit 34 inputs key-in signals through the respective keys 9–11 thereof to the CPU 25 to which a barometer 28 inputs a signal indicative of an atmospheric pressure.

The RAM 26 includes registers 26a–26f schematically shown in FIG. 5. The register 26a stores data on the size of the tire of the front wheel 2 in the form of its peripheral length and keyed in by the key 12. The register 26b stores data on the current traveling speed calculated in accordance with "(3600/counting period) x the peripheral length of the front wheel" where the counting period is the time taken from a reed switch turning-on (counting) operation where the magnet 4 passes by the transmitter 6 to the next reed switch turning-on (counting) operation. The register 26c stores data on the covered distance calculated on the basis of "(the count of the turning-on operations) x the peripheral length of the wheel". The register 26d stores data on a tilt angle of the road calculated from a height change where the bicycle 1 has encountered and the distance covered by the bicycle 1. The register 26e stores data on an atmospheric pressure measured by the barometer 28. The register 26f stores data on a height corresponding to the atmospheric pressure, data on which is stored in the register 26e, and read from ROM 27.

The ROM 27 stores a gear change conversion table 32 of FIG. 6 and a height-pressure conversion table 33 of FIG. 7. The gear change conversion table 32 stores data on six kinds of gears Nos. 6-1 suitable for the corresponding tilt angles such that an appropriate gear may be selected on the basis of a tilt angle of the road. The height-atmospheric conversion table 33 stores data on heights and corresponding atmospheric pressures in corresponding relationship such that a height may be specified from a corresponding atmospheric pressure.

Figure 8:
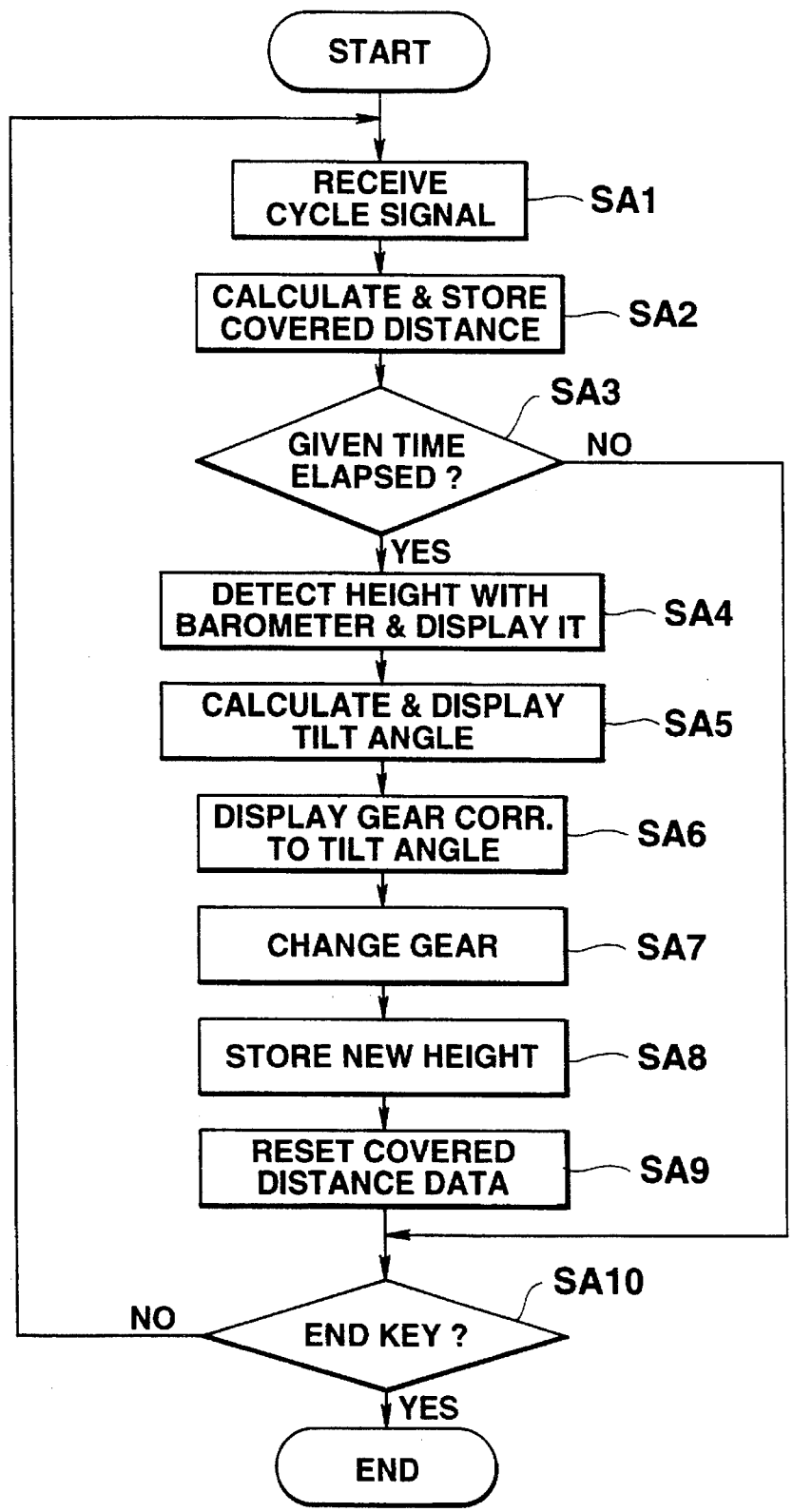
FIG. 8 is a flowchart indicative of the operation of the embodiment.

In the present embodiment, the CPU 25 operates in accordance with a flowchart of FIG. 8 and performs a cycle signal reception process (step SA1). In this process, when the front wheel 2 rotates and the magnet 4 passes by the transmitter 6, the reed switch 13 provided in the transmitter 6 is turned on to generate a reed switch signal a, as shown in FIG. 3. In response to this signal, the detector 14 outputs a clock signal b of a predetermined period such that the transistor 19 repeats an on-off operation for a short time. This causes the electromagnetic induction coil 21 of the transmitter 6 to output a resonant pulse (electromagnetic induction signal) of a short time duration directly after the magnet 4 has passed by the transmitter 6.

In response to the resonant pulse, the electromagnetic induction coil (not shown) provided in the receiving circuit 24 generates a receipt signal due to electromagnetic induction. This receipt signal is inputted to and counted by the CPU 25 at the timing when the magnet 4 passes by the transmitter 8 due to rotation of the front wheel 2 or at each rotation of the front wheel. At step SA2 the CPU 25 calculates the distance which the bicycle has covered so far on the basis of "the count of the reed switch turning-on operations x the peripheral length of the front wheel" and stores data on the calculated distance.

It is then checked whether a given time has elapsed (step SA3). If not, it is checked whether the end key 11 has been operated (step SA10). If not, control returns to step SA1. Thus, a looping operation SA1→SA2→SA3→SA10→SA1 is iterated until the given time has elapsed without the end key being operated to thereby calculate the travelled distance. Each time the given time has elapsed, processes at steps SA4–SA9 are executed. At step SA4 a height where the bicycle 1 travels is detected by the barometer 28 and displayed on the display 8. Since the height-atmospheric pressure conversion table 33 of FIG. 7 stores data on heights and corresponding atmospheric pressures in a corresponding relationship, data on a height corresponding to an atmospheric pressure sensed by the barometer 28 is read from the table 33 and stored in the register 26f of the RAM 26 and displayed on the display 8.

At step SA5 the tilt angle of the road is calculated and displayed on the display 6 as follows. When a given time has elapsed after the calculated new height is stored at step SA8 (to be described later), a further new height is calculated at step SA4. At this time, there are two data items on the heights stored at step SA8 and calculated at step SA4 after the given time has elapsed. Let the difference between those heights be $\Delta H$. Data on the covered distance is reset at step SA9 to be described later. Thus, when the lapse of the given time is determined at step SA3, the distance covered in the given time has been calculated. Let this distance be $\Delta L$. A tilt angle $\theta$ of the road where the bicycle has traveled is given by $$\theta = \sin^{-1}(\Delta H/\Delta L)$$

which is calculated and displayed at step SA5.

After the calculation and display of the tilt angle $\theta$, a gear No. corresponding to the tilt angle $\theta$ is read and displayed from the gear change conversion table 32 of FIG. 6 (step SA6) and gear changing is then performed (step SA7). More particularly, at step SA7 the CPU 25 outputs a gear signal indicative of the appropriate one of the gears Nos. 1–6. In response to the gear signal, the gear changer 29 generates a drive signal, in response to which the transmission 51 operates to bring about the gearing state of the appropriate one of the gears Nos. 1–6. Subsequently, the processes at steps SA8 and SA9 are performed. It is then determined whether the end key 11 is operated (step SA10). The processes at steps SA1–SA10 are iterated until the end key 11 is operated each time the given time has elapsed. When the end key is operated, the processes at steps SA1–SA10 are ended.

Figure 9:
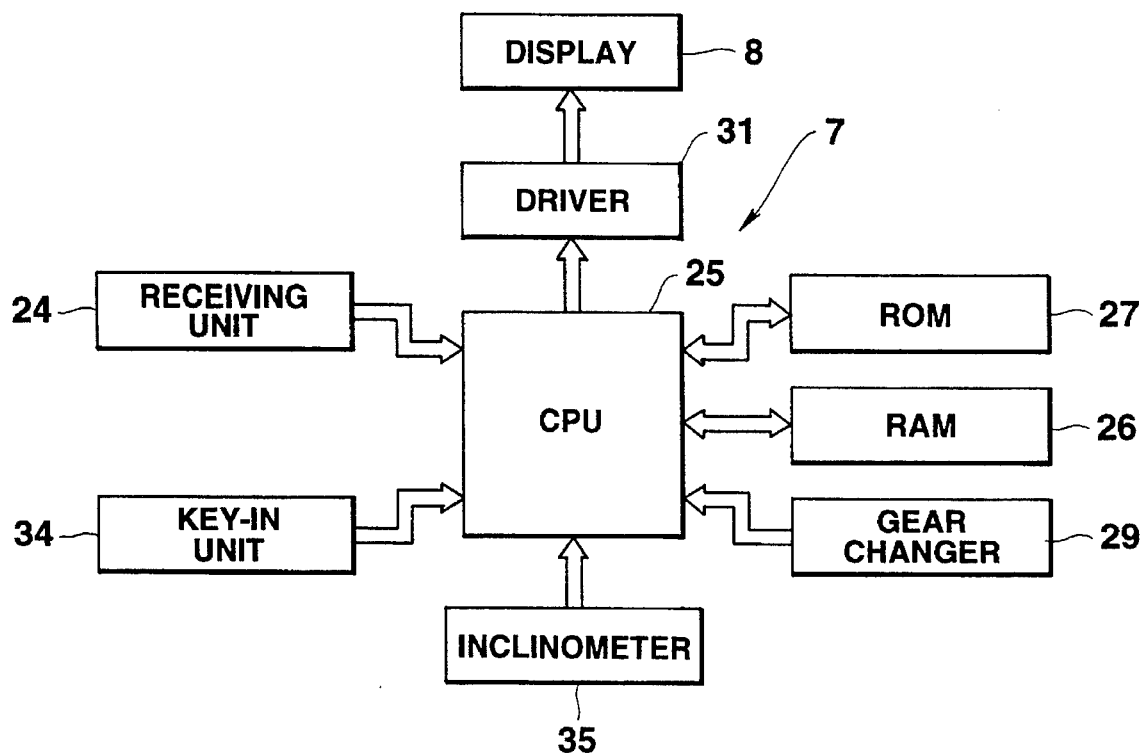
FIG. 9 is a block diagram of a receiver of a further embodiment of the present invention.

FIG. 9 is a block diagram of a receiver 7 in another embodiment of the present invention. In this embodiment, instead of the barometer 28 of the previous embodiment of FIG. 4, an inclinometer 35 is used which detects a tilt angle of the body 5 of the bicycle 1 or the tilt angle of a road on which the bicycle travels, and outputs a signal indicative of the detected tilt angle to the CPU 25. The RAM 26 includes registers 26a'–26d' of FIG. 10. The register 26a' stores data on the size of the tire of the front wheel 2 in the form of its peripheral length and keyed in by the key 12. The register 26b' stores data on the current traveling speed calculated in accordance with "(3600/counting period) x the peripheral length of the front wheel" where the counting period is the time taken from a reed switch turning-on (counting) operation where the magnet 4 passes by the transmitter 6 to the next reed switch turning-on (counting) operation. The register 28c' stores data on the covered distance calculated on the basis of "(the count of the turning-on operations) x the peripheral length of the wheel". The register 26d' stores data on a tilt angle of the road detected by the inclinometer 36.

In the present embodiment, the CPU 25 operates in accordance with a flowchart of FIG. 11 and performs a cycle signal reception process (step SB1). In this process, when the front wheel 2 rotates and the magnet 4 passes by the transmitter 6, the reed switch 13 provided in the transmitter 6 is turned on to generate a reed switch signal a, as shown in FIG. 3. In response to this signal, the oscillator 15 outputs a clock signal b of a predetermined period such that the transistor 19 repeats an on-off operation for a short time. This causes the electromagnetic induction coil 21 of the transmitter 6 to output a resonant pulse (electromagnetic induction signal) of a short time duration directly after the magnet 4 has passed by the transmitter 6.

In response to the resonant pulse, the electromagnetic induction coil 21 provided in the receiver 24 generates a receipt signal by electromagnetic induction. This receipt signal is inputted to and counted by the CPU 25 at the timing when the magnet 4 passes by the transmitter 6 due to rotation of the front wheel 2 or at each rotation of the front wheel 2. At step SB2 the CPU 25 calculates the distance covered so far in accordance with "the count of the reed switch turning-on operations x the peripheral length of the front wheel", calculates the traveling speed (per hour) of the bicycle on the basis of "(3600/counting period) x the peripheral length of the wheel" and stores data on those calculated distance and traveling speed in the RAM 26. The inclinometer 35 then measures a tilt angle of the road (step SB3) to determine whether the road has a tilt (step SB4). If not, no process at steps SB6 and SB6 are performed, but control passes to step SB7, where it is determined whether the end key 11 has been operated. If not, control returns to step SB1.

If it is determined at step SB4 that there is a tilt in the road, data on a gear corresponding to the tilt angle detected at step SB3 is read from the gear change conversion table 32 of FIG. 6 and displayed on the display 8 (step SB5). Subsequently, gear changing is performed (step SB6). That is, in a manner similar to that mentioned above, the transmission 51 is actuated in response to a drive signal from the gear changer 29 to put the appropriate one of the gears Nos. 1–6 in an engaged state. The processes at steps SB1–SB10 are iterated until the end key 11 is operated each time the given time has elapsed. When the end key 11 is operated, the processes at steps SB1–SB10 are ended.

While in the present embodiment gear setting is illustrated as being performed in correspondence to only the tilt angle of the road, it may be performed in correspondence to a tilt angle of the road and the calculated traveling speed of the bicycle, data on which is stored in corresponding relationship on a gear change conversion table of FIG. 12 to thereby perform more efficient traveling.

An embodiment of the present invention in which a barometer is applied for weather prediction will be described with respect to the drawings. The arrangement of the device of FIGS. 1–3 is also used in the present embodiment and further description thereof will be omitted.

FIG. 13 is a block diagram of a receiver 7. In FIG. 13, an electromagnetic induction signal from an electromagnetic coil 21 of a transmitter 8 is received by a receiving circuit 24 and sent to a CPU 25. The CPU 25 operates in accordance with a program stored in a program ROM (not shown) and data stored in a RAM 26 to thereby control the whole receiver 7. The CPU 25 controls a display 8 through a display driver 31. CPU 25 receives signals from a barometer 28, a key-in unit 34 with a plurality of keys 10–12 each of which keys in data, an inclinometer 35 which detects a tilt angle of a surface of a road on which the bicycle 1 travels and a crystal oscillator 36 which generates a clock signal of a given frequency.

The RAM 26 includes registers a–f schematically shown in FIG. 14; i.e., a clocking register a which stores data on the current time based on clocks from the crystal oscillator 36; a tire size register b which stores data on the peripheral length of the front wheel 2 representing its tire size keyed in by the other key 12; a traveling speed register c which stores data on the current traveling speed calculated in accordance with "(3800/counting period) x the peripheral length of the front wheel" where the counting period is the time taken from a reed switch turning-on (counting) operation where the magnet 4 passes by the transmitter 6 to the next reed switch turning-on (counting) operation; and a covered distance register d which stores data on the covered distance calculated on the basis of "(the count of the turning-on operations) x the peripheral length of the wheel".

The RAM 26 also includes a θ-change covered distance register e which stores data on the distance covered each time the tilt angle θ changes; a tilt angle register f which stores data on the tilt angle of a road surface detected by the inclinometer 35; an initial atmospheric pressure value register g which stores data on the atmospheric pressure $P_1$ measured by the barometer 28 at the starting point; and a changed atmospheric pressure register h which stores data on the atmospheric pressure measured by the barometer 28 each time the atmospheric pressure changes. The ROM 27 includes a height-atmospheric conversion table 33 of FIG. 15 which stores data on the respective heights and the corresponding atmospheric pressures such that an atmospheric pressure is specified from the corresponding height and vice versa and such that the difference in atmospheric pressure between any two specified heights is specified.

In the present embodiment, when the front wheel 2 rotates and the magnet 4 passes by the transmitter 6, the reed switch 13 provided in the transmitter 6 is turned on. As shown in FIG. 3, when the electromagnetic induction coil 21 of the transmitter 6 outputs a resonant pulse c, the electromagnetic induction coil (not shown) provided in the receiving circuit 24 generates a receipt signal by electromagnetic induction. This receipt signal is inputted to and counted by the CPU 25 at the timing when the magnet 4 passes by the transmitter 6 due to one rotation of the front wheel 2 or at each rotation of the front wheel. The CPU 25 calculates the current traveling speed in accordance with the "(3600/counting period) x the peripheral length of the front wheel" and calculates the covered distance register d which stores data on the covered distance calculated on the basis of "(the count of the reed switch turning-on operations) x the peripheral length of the front wheel".

In response to the operation of the start key 11 at the beginning of the travel of the bicycle 1, the CPU 25 starts to operate in accordance with a flowchart of FIG. 16. First, the atmospheric pressure $P_1$ at the starting point is measured on the basis of a signal received from the barometer 28 (step S1). The CPU 25 then determines on the basis of a signal from the inclinometer 35 whether the tilt angle θ is 0 (step S2), and waits until the traveling state of the bicycle where the tilt angle is not equal to 0 occurs, at which time the CPU 25 starts to measure a covered distance for the corresponding height (step S3). It then checks whether the tilt angle θ has changed (step S4) and iterates a looping operation including steps S3→S4→S3 until the tilt angle θ during which looping operation the covered distance for the tilt angle θ is calculated at step S3.

When there is a change in the tilt angle θ and travel at a different tilt angle begins, the CPU 25 starts to calculate a height H on the basis of equation H=L·sin θ where L is the covered distance (step S5) and stores data on the height (step S6). The CPU 25 then measures on the basis of a signal from the barometer 28 the atmospheric pressure $P_2$ at the position where the height H is calculated (step S7). The atmospheric pressure $P_2$ measured at the point of the height H includes a change in the atmospheric pressure due to a change in the actual weather and a change in the atmospheric pressure due to the change in the height compared to the atmospheric pressure at the starting point $P_1$.

The atmospheric pressure $P_3$ at the calculated height H due to the change in the atmospheric pressure which, in turn, is due to the change in the height is calculated on the basis of the atmospheric pressure $P_1$ at the starting point measured beforehand at step S1 (step S8). If the calculated height is, for example, 800 m, the corresponding atmospheric pressure is 920.8 hp on the height-atmospheric pressure conversion table 32 of FIG. 6. Since the atmospheric pressure is 1013.3 hp at a height of 0 m, the difference $\alpha$ between both the atmospheric pressures is 92.5 hp (=1013.3–920.8), which is a change in the atmospheric pressure due to the change alone in the height. Thus, by subtraction of this change $\alpha$ (=92.5 hp) in the atmospheric pressure from the atmospheric pressure $P_1$ to thereby calculate the pressure $P_3=P_1-\alpha$ due to the calculated height alone and to store data on the pressure $P_3$ (step S9).

The stored atmospheric pressure $P_3$ is then compared to an atmospheric pressure $P_2$ measured actually at the calculated height H (step S10) to provide $P_4=P_2-P_3$ (step S10). As mentioned above, the atmospheric pressure $P_3$ is a change in the atmospheric pressure due to only the difference in height between the starting point and the calculated height H. The atmospheric pressure $P_2$ measured at the height H includes the change in the atmospheric pressure due to the changes in the weather and in the height. Thus, the change $P_4$ in the atmospheric pressure due to the actual change in the weather is obtained as the difference $(P_2-P_3)$.

When $P_4$ is obtained, it is determined whether $P_4$ exceeds 3 hp (step S11). If so, "It is fine" or "the weather is greatly improving" is displayed on the display 8 (step S12). If not at step S11, it is determined whether 3 hp$\geq P_4 \geq$0 hp (step S13). If so, "It is fine - cloudy" or "The weather is improving" is displayed (step S14). If not at step S13, it is determined whether 0 hp$>P_4\geq$–3 hp (step S15). If so, "It is raining or is cloudy" or "The weather is deteriorating" is displayed (step S16). When none of the conditions at steps S11, S13 and S15 is satisfied and the change $P_4$ in the atmospheric pressure is less than –3 hp, "It is raining" or "The weather is greatly deteriorating" is displayed (step S17). Control then returns to its starting point.

A picture representing the weather may be displayed on the display 8.

The change $P_4$ in the atmospheric pressure may be obtained by multiplying a calculated height by a beforehand stored change in the atmospheric pressure per unit height to obtain a change in the atmospheric pressure due to an increase in the height, subtracting the change in the resulting atmospheric pressure from the pressure $P_1$ at the starting point, comparing the result of the subtraction and the atmospheric pressure measured at the height difference H to provide the change in the atmospheric pressure $P_4$ due to the actual change alone in the atmospheric pressure.

Alternatively, the change in the atmospheric pressure $P_4$ may be obtained by detecting a height at the starting point from the atmospheric pressure $P_1$ at the starting point, detecting from the ROM 27 an atmospheric pressure at a height which is the sum of the calculated height H and the height at the starting point, comparing the detected atmospheric pressure and the atmospheric pressure $P_2$ measured at the calculated height H to provide a change $P_4$ alone in the actual atmospheric pressure.

Further, according to the present invention, the change $P_4$ in the atmospheric pressure due to the actual change alone in the atmospheric pressure may be obtained in other various manners without departing from the spirit and main features of the present invention.

What is claimed is:

1. An electronic device for a vehicle, comprising:

atmospheric pressure measuring means for measuring an atmospheric pressure to provide data on the measured atmospheric pressure;

first atmospheric pressure data storage means for storing first data on an atmospheric pressure at a first point measured by the atmospheric pressure measuring means;

second atmospheric pressure data storage means for storing second data on an atmospheric pressure measured by the atmospheric pressure measuring means at a second point different from the first point;

height difference data storage means for storing data on the difference between the first and second heights;

difference pressure calculating means for providing data on the actual atmospheric pressure difference between the first and second atmospheric pressures, data on which are stored in the first and second atmospheric pressure storage means, respectively; and display means for displaying data based on data on the actual atmospheric pressure difference provided by the difference pressure calculating means.

2. An electronic device according to claim 1, wherein the display means displays data on weather prediction corresponding to the atmospheric pressure difference provided by the difference pressure calculating means.

3. An electronic device according to claim 1, wherein the height difference data storage means comprises:

covered distance calculating means for calculating a covered distance;

tilt angle detecting means for detecting a tilt angle of a road where the vehicle travels; and height calculating means for calculating the height of the road on the basis of data on the tilt angle detected by the tilt angle detecting means and data on the covered distance calculated by the covered distance calculating means.

4. An electronic device according to claim 3, wherein the electronic device is mounted on a bicycle, and wherein the covered distance calculating means comprises:

a magnet attached to a wheel of the bicycle;

a magnetic sensor for sensing the magnet attached to the bicycle wheel each time the wheel makes a complete rotation; and travelled distance calculating means for calculating the covered distance of the bicycle on the basis of the sensing of the magnet by the magnetic sensor, the measured number of rotations of the wheel and beforehand stored data on a distance which the wheel covers during a complete rotation of the wheel.

5. An electronic device according to claim 1, wherein the difference pressure calculating means comprises:

unit change amount storage means for storing data on a change amount in the atmospheric pressure per unit height;

atmospheric pressure calculating means for calculating an atmospheric pressure for a height difference, data on which is stored in the height difference data storage means from the data on the change amount stored in the unit change amount storage means; and comparing means for adding data on the atmospheric pressure calculated by the atmospheric pressure calculating means to data on the atmospheric pressure stored in the second atmospheric pressure data storage means and for comparing data on the result of the addition and data on the first atmospheric pressure stored in the first atmospheric pressure data storage means, thereby providing data on the difference pressure.

6. An electronic device according to claim 5, wherein the unit change amount data storage means comprises:

change amount data storage means which stores an atmospheric pressure change amount per unit height differing depending on a height; and atmospheric pressure height data storing means for storing data on a height corresponding to data on an atmospheric pressure, wherein the atmospheric pressure calculating means reads from the atmosheric pressure height data storing means data on a height corresponding to data on the first atmospheric pressure stored in the first atmospheric pressure data storage means, adds the read data on a height and the data on a height difference stored in the height difference data storage means, detects from the change amount data storage means data on a change amount in the atmospheric pressure at a height corresponding to the result of the addition, and calculates data on an atmospheric pressure change corresponding to and from the height difference, data on which is stored in the height difference data storage means.

7. An electronic device according to claim 1, wherein the difference pressure calculating means comprises:

atmospheric pressure height storing means for storing data on a height corresponding to data on an atmospheric pressure; and atmospheric pressure detecting means for detecting from the atmospheric pressure height storage means data on a height corresponding to data on first atmospheric pressure stored in the first atmospheric pressure data storage means, adding the detected data on a height and the data on a height difference stored in the height difference data storage means, and detecting from the atmospheric pressure height storage means data on an atmospheric pressure corresponding to a height obtained as the result of the addition; and comparing means for comparing data on the atmospheric pressure detected by the atmospheric pressure detecting means and data on a second atmospheric pressure stored in the second atmospheric pressure data storage means, thereby providing data on an atmospheric difference indicative of the result of the comparison.

8. An electronic device according to claim 1, wherein the device is attached to a bicycle.

9. An electronic device according to claim 1, wherein the display means displays a picture corresponding to weather.

* * * * *